United States Patent [19]
Mifune et al.

[11] Patent Number: 5,186,619
[45] Date of Patent: Feb. 16, 1993

[54] FLOW RATE REGULATING MECHANISM FOR GAS LIGHTERS AND SIMILAR DEVICES AND METHOD OF PRODUCING A MICROCELL POLYMER FILTER FOR USE THEREIN

[75] Inventors: Hideo Mifune; Masato Seki; Tsutomu Shike, all of Shizuoka, Japan

[73] Assignee: Tokai Corporation, Yokohama, Japan

[21] Appl. No.: 685,638

[22] Filed: Apr. 16, 1991

[30] Foreign Application Priority Data

Jun. 20, 1990 [JP] Japan .................................. 2-159990
Mar. 25, 1991 [JP] Japan .................................. 3-60350

[51] Int. Cl.$^5$ ............................................. F23D 14/28
[52] U.S. Cl. ..................................... 431/344; 126/414; 126/409; 55/524; 55/DIG. 13
[58] Field of Search .............. 431/344, 204, 245, 277; 126/414, 413, 409, 407; 251/118; 55/524, 528, DIG. 13; 222/2

[56] References Cited

U.S. PATENT DOCUMENTS

| | | | |
|---|---|---|---|
| 3,523,005 | 8/1970 | Piffath et al. | 431/344 |
| 3,860,385 | 1/1975 | Nakanishi | 431/344 |
| 4,666,401 | 5/1987 | Royer | 431/344 |
| 4,669,975 | 6/1987 | Martinez | 431/344 |
| 4,746,288 | 5/1988 | Graham | 431/344 |
| 5,087,278 | 2/1992 | Suzuki | 55/524 |

FOREIGN PATENT DOCUMENTS 3735729  5/1989 Fed. Rep. of Germany.
2452061 10/1980 France.

*Primary Examiner*—James C. Yeung
*Attorney, Agent, or Firm*—Staas & Halsey

[57] ABSTRACT

A flow regulating mechanism for a gas emitting device featuring a microcellular polymer filter having connected, continuous bubbles through which fuel passes and independent air bubbles which expand with increases in temperature compressing and thereby restricting the flow of fuel through the connected, continuous bubbles.

13 Claims, 7 Drawing Sheets

FIG. 3 PRIOR ART
FIG. 4 PRIOR ART
FIG. 5 PRIOR ART
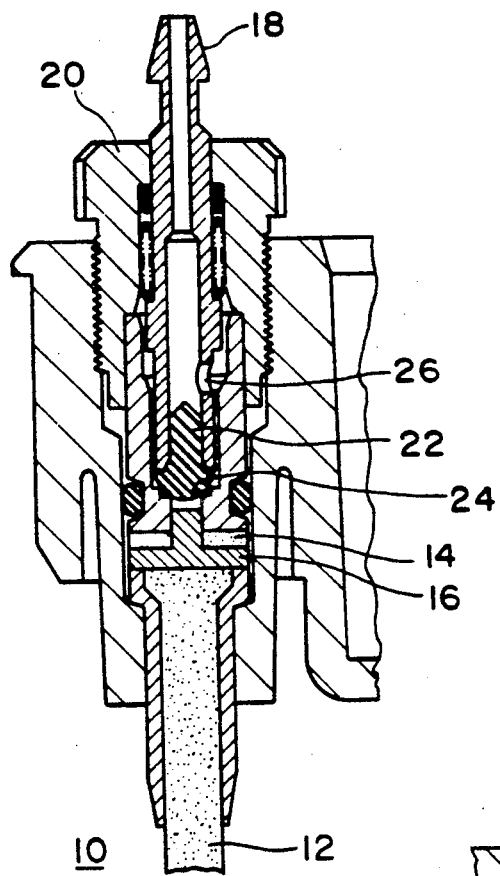
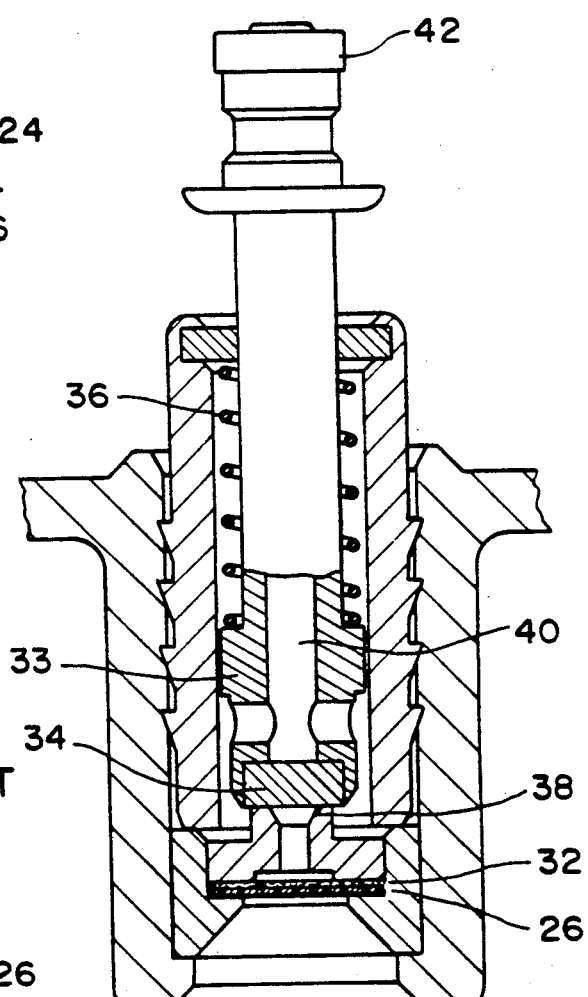
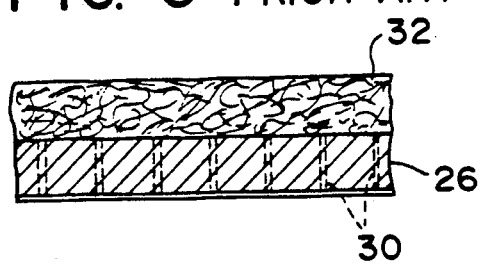

FIG. 9
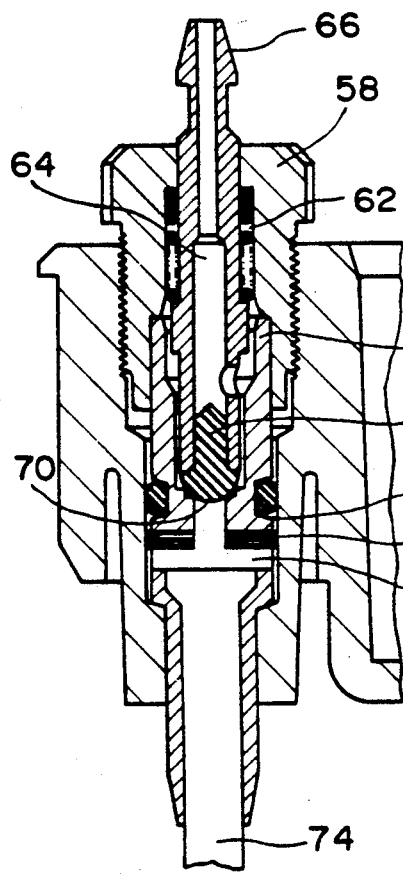
FIG. 10
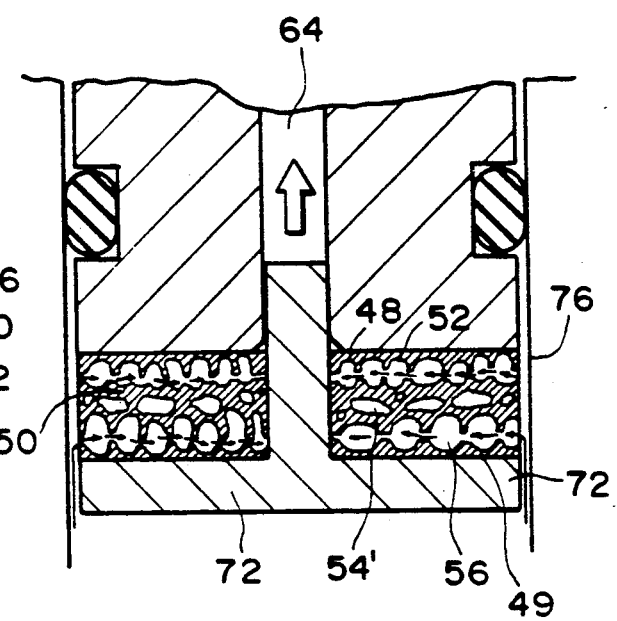
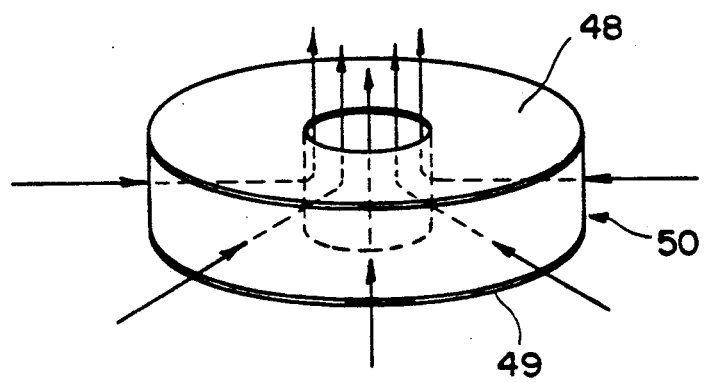
FIG. 11

FLOW RATE REGULATING MECHANISM FOR GAS LIGHTERS AND SIMILAR DEVICES AND METHOD OF PRODUCING A MICROCELL POLYMER FILTER FOR USE THEREIN

BACKGROUND OF THE INVENTION

1. Field of the Invention

The present invention relates to a fuel flow regulating mechanism for gas cigarette lighters, torches, burners, hair curlers and other similar devices, and a method of producing a microcell polymer filter for use therein to ensure the desired constant flow of gas fuel through the burner.

2. Description of the Prior Art

In an effort to provide for the reliable and safe passage of gas in lighters and other appliances utilizing liquified petroleum gasses such as n-butane, i-butane and propane, efforts have been made to discover new materials and to design new mechanisms for use in such appliances which are capable of constantly regulating the flow of gaseous fuel. Two prior art structures will be discussed in detail hereinafter.

SUMMARY OF THE INVENTION

The object of the present invention is to provide for the constant flow of predetermined amounts of gaseous fuel through the nozzle or burner valve of lighters and other flame emitting devices, and, accordingly, to eliminate the need for a manually operable fuel flow regulating member.

Microcell polymer in sheet form is deformed by thermal compression under specified conditions and, thereafter, disk-shaped filters are fabricated for assembly within the burner valve mechanism of the lighter or other device. The thermal compression of the microcell polymer forms independent air bubbles which close certain of the passages, through which gas may pass, formed by the remaining continuous, connected air bubbles. During operation of the lighter or other appliance, rises in temperature are accompanied by the expansion of the previously formed independent air bubbles, resulting in compressing the connecting, continuous air bubbles through which the fuel passes, thus automatically reducing the flow of fuel therethrough.

BRIEF DESCRIPTION OF THE DRAWINGS

FIG. 3 is a cross-sectional view of a burner valve construction provided with a prior art flow control filter;

FIG. 4 is a cross-sectional view of a further prior art burner valve construction featuring a microporous membrane, particularly a molecularly oriented olefin for example polypropylene or polyethylene;

FIG. 5 is a cross-sectional view of the prior art microporous filter and its covering porous sheet;

FIG. 9 is a cross-sectional view of a burner valve construction featuring the microcell polymer filter of the present invention;

FIG. 10 is a cross-sectional view of that portion of the burner valve construction of the present invention which supports the microcell polymer filter, illustrating schematically the passage of fuel through the continuous, connected bubbles;

FIG. 11 is a perspective view of the microcell polymer filter showing the radially inward passage of fuel therethrough;

DESCRIPTION OF THE PREFERRED EMBODIMENT

Figure 2:
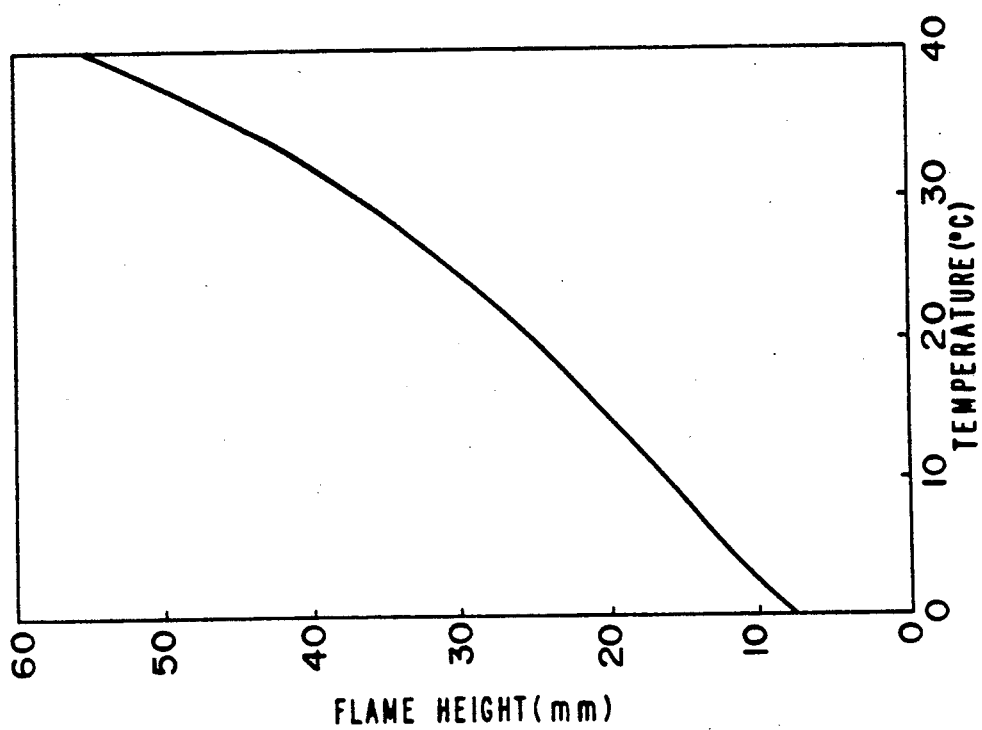
FIG. 2 is a graph illustrating the relationship between temperature and flame height in lighters employing prior art filters.
Figure 1:
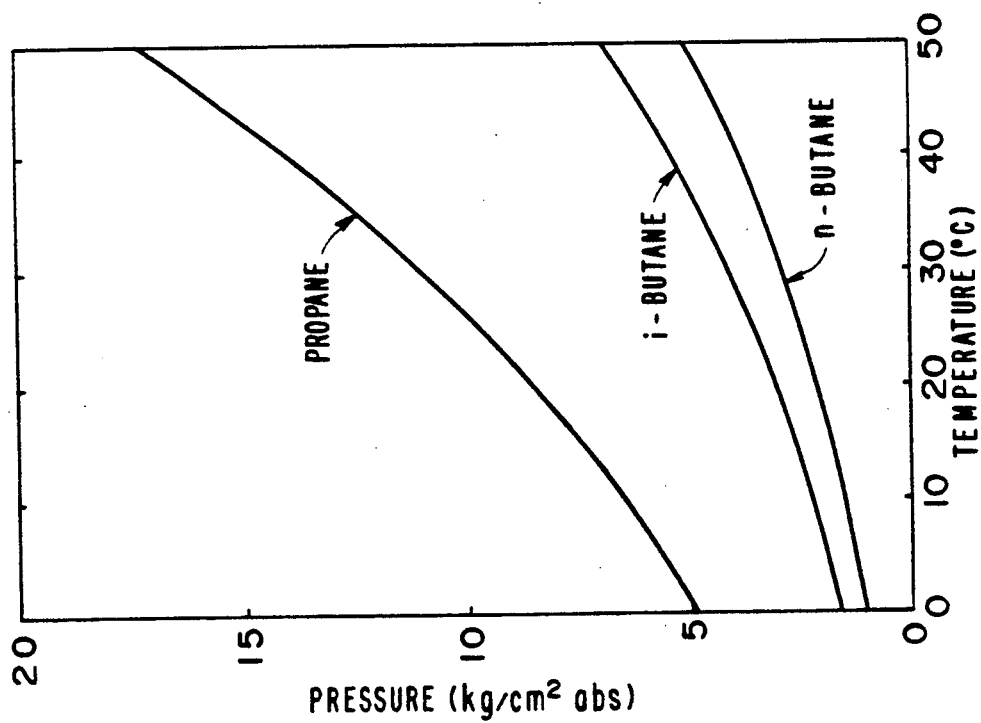
FIG. 1 is a graph illustrating the relationship between temperature and pressure for propane, i-butane and n-butane.

FIGS. 1 and 2 are graphs illustrating the relationship between gas pressure and temperature, and flame height and temperature, respectively. It will be apparent from FIG. 1, which provides curves for propane, i-butane and n-butane, that as the temperature within the lighter increases, the gas pressure increases. FIG. 2 illustrates the relationship between the flame height and the temperatures in lighters employing prior art filters. From the foregoing, it is apparent that as the temperature of the fuel rises, it is necessary to control the length of the flame to ensure reliability and safety.

A burner valve mechanism typical of the prior art is illustrated in FIG. 3. In this prior art valve construction liquified gas from within the reservoir 10 passes upwardly through a porous polyethylene wick 12 and is gasified at the upper end thereof. The gaseous fuel then passes through the disk-shaped filter 14, which rests upon a nail-shaped retainer 16. An operating handle is provided on the lighter or other device, such that as the user activates same the nozzle 18 is moved upwardly against the force of a spring removing the gasket 22 from engagement with the seat 24, permitting gasified fuel to enter the nozzle 18 through the port 26. An adjustment arm, not shown, may be employed to turn the outer moveable valve member 20 to exert more or less pressure on the filter 14 to control the amount of gas passing through the nozzle 18. In this manner, the flame height may be controlled manually by compressing and relaxing the filter 14.

Another prior art gas flow regulating mechanism is illustrated FIGS. 4–5. In this prior art construction, a microporous membrane 26, such as disclosed in U.S. Pat. No. 4,478,570, for example, is employed. More particularly, the microporous membrane 26, as specified in U.S. Pat. No. 4,478,570, consists of a molecularly oriented olefin, particularly polypropylene or polyethylene, and has pores, schematically designated by the reference numeral 30 in FIG. 5, of radius ranging 20 to 500 Angstrom units. The lower face of the membrane 26 is in direct communication with the reservoir 28 of the lighter or torch. As seen in FIG. 5, the upper face of the membrane 26 is laminated or sealed with a non-woven mat or cloth 32.

As seen at FIG. 4, the moveable nozzle member 33 is provided with a sealing gasket 34 normally biased into closed position against the seat 38 by a spring 36. Thus, when the valve member 33 is raised, the gasket 34 is moved away from the seat 38 and gas enters the passage 40 flowing outwardly through the top of the nozzle member 33.

With the foregoing in mind the present invention will now be described.

The material of the filter of the present invention is microcellular polymer in the form of a foamed filter made of ether type polyurethane having cells (bubbles) of 10-300 μm in diameter and a density of 0.1-0.6 g/cm$^3$. Such microcell polymer sheet material may be prepared, for example, in accordance with the teachings of Japanese Patent No. 938,508 (Publication No. 53 (1978) - 8735).

Figure 6:
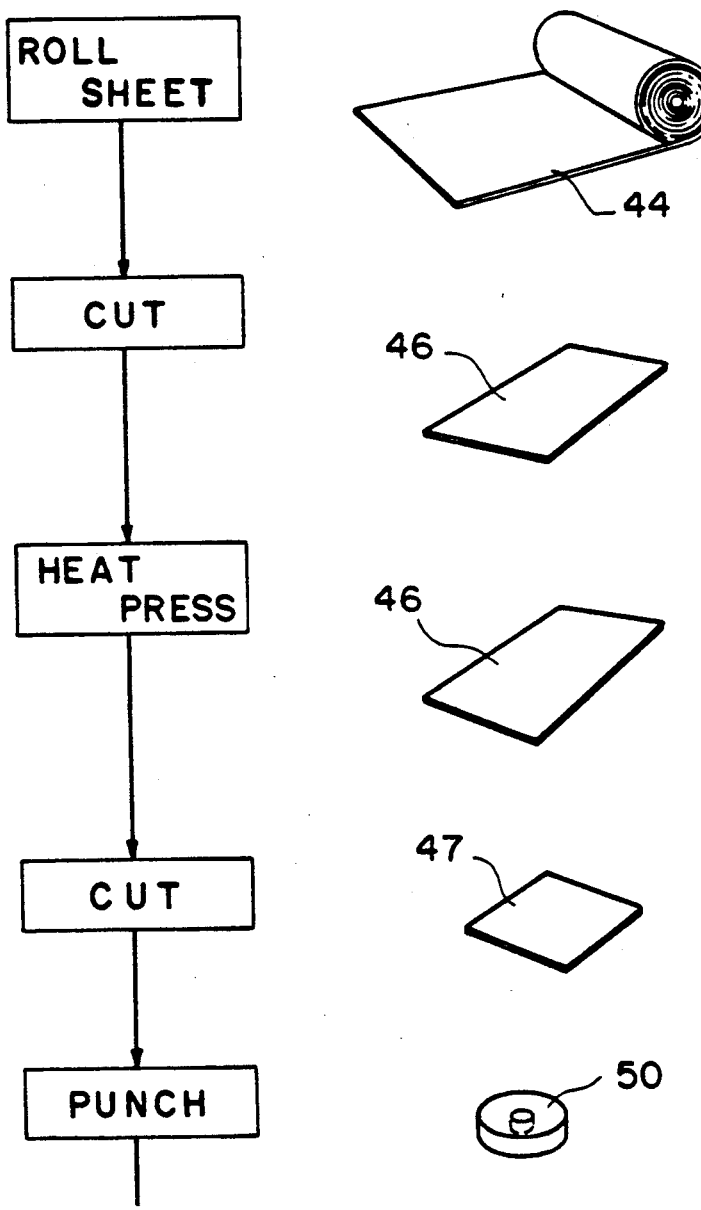
FIG. 6 is a schematic diagram illustrating the method steps of producing the filter of the present invention from roll sheets of microcellular polymer.

FIG. 6 schematically illustrates the method for producing filters from roll sheets 44 of a microceller polymer material such as Poron H-48. The roll sheets 44 are first cut to portions 46 of desired size. Thereafter, each portion 46 is deformed in the vertical direction by thermal compression at approximately 180 degrees centigrade for approximately five minutes. This thermal compression reduces the thickness of the filter material 46 to the extent necessary to accomplish the objectives of the present invention, as discussed hereinafter. The thickness of each portion 46 of filter material may, for example, be reduced from approximately 2.0 mm to 1.5 mm. The thermally compressed filter portion 46 is thereafter cut to form portion 47 and finally punched to form the filter element 50, which is thereafter assembled within the valve mechanism of the lighter or other device. The initial flame length for the factory set is adjusted by turning the threaded member 58 (FIG. 9) at the time of assembly.

Figure 7:
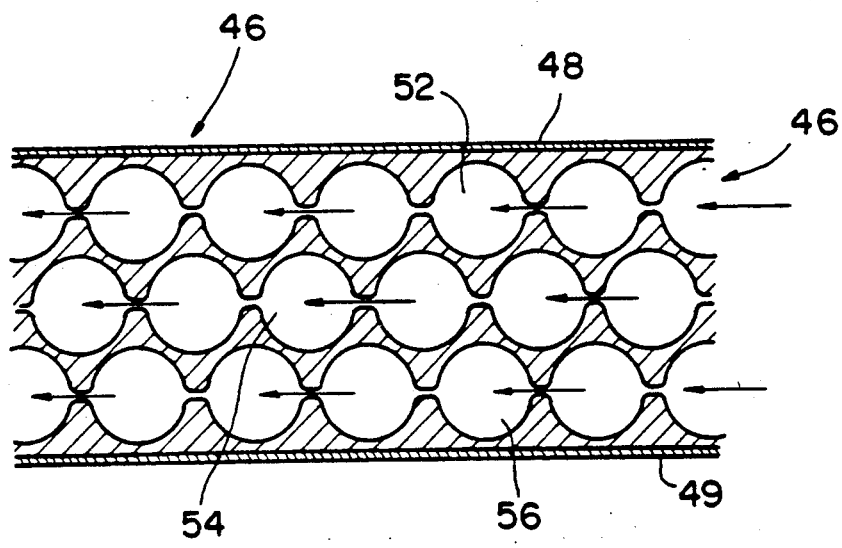
FIG. 7 is an enlarged, sectional view of a portion of the microcell polymer filter before it is thermally compressed.
Figure 8:
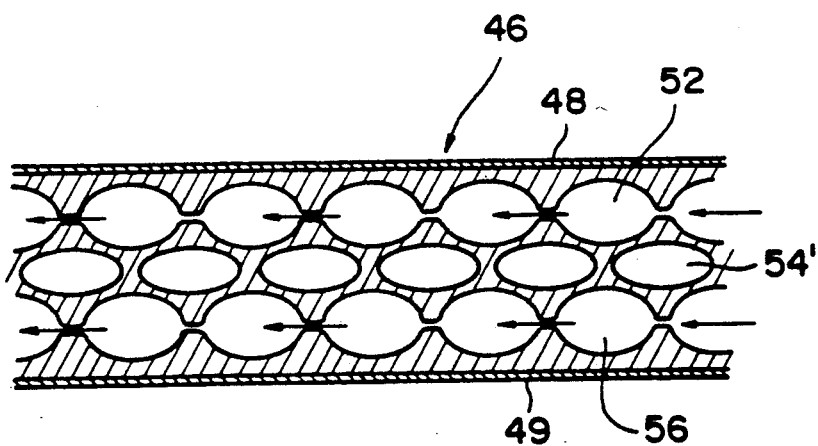
FIG. 8 is an enlarged, sectional view of the microcell polymer filter after it is thermally compressed, illustrating the reformation of the independent air bubble structures, particularly the reduction in the number of continuous, connected bubble formations which define passages through which the gaseous fuel may pass.

FIGS. 7-8 illustrate the microcell polymer portion 46 before and after thermal compression. These pictorial representations are schematic only and are designed to simplify an understanding of the reformation of the air bubble structures accomplished during the thermal compression.

As seen in FIG. 7, the microcell polymer sheet portion 46 has fused upper and lower layers 48 and 49, respectively, which are substantially not gas permeable. Rows of continuous, connected air bubbles 52, 54 and 56 define passageways through which the gaseous fuel may pass.

After the step of thermal compression, the configurations of the various air bubbles are reformed, as illustrated in FIG. 8. More particularly, the thermal compression rearranges the air bubbles 54 redefining same as independent or non-connected air bubbles designated by the reference numeral 54'. The result is to decrease the number of connected, continuous air bubbles 52, 56 and thereby decrease the amount of fuel capable of passing therethrough.

The burner valve within which the microcell polymer filter 50 of the present invention is used is illustrated in FIGS. 9-11. The construction and operation of the burner valve per se is very similar to that illustrated in FIG. 3, and consists of a threaded member 58 within which is mounted a movable nozzle member 66 normally biased into closed position by a spring 62. The movable nozzle member 66 is provided with a central passageway 64. A gasket 68 is normally biased downwardly by the action of the spring 62 into engagement with the valve seat 70 of a valve seat member 60. The microcell polymer filter 50 is positioned on the retaining member 72.

When the nozzle 66 is raised during operation, the gasket 68 is moved upwardly away from the valve seat 70 and thereafter liquified gas moves upwardly through the wick 74 and thereafter gasifies at the upper end thereof. The gaseous fuel moves upwardly along the inside walls 76, and turns radially inwardly passing horizontally through the filter 50, as seen in FIGS. 10-11. It is not possible for gas to enter or leave the top and bottom surfaces 48 and 49 of the filter 50 since these surfaces are fused and thereby substantially non-permeable. The gaseous fuel thereafter moves upwardly along central passageway 64 and exits through the tip of the nozzle 66.

FIG. 10 illustrates the passage of gaseous fuel through the various configurations of bubbles 52,56 within the filter 50. While the bubble formations are schematic only, it will be apparent that gaseous fuel passes radially inwardly through the connected continuous air bubbles 52 and 56 and thereafter upwardly into the passageway 64 within the nozzle 66. As the temperature at the filter 50 rises, the gas trapped within the independent air bubbles 54' expands causing the independent air bubbles 54' to expand and press against and thereby decrease the size of the continuous bubbles 52 and 56 thus reducing the amount of gas capable of passing therethrough.

From the foregoing, it is apparent that the amount of gas permeation depends upon the relative volumetric ratios of the continuous and independent bubbles 52, 56 and 54', respectively. This phenomenon is not present in filters of conventional foam urethane, where thin walls separate the bubble formations and thermal compression does not, therefore, produce a combination of continuous and independent (non-continuous) air bubble formations.

With the microcell polymer filter 50 of the present invention, which features appropriately arranged independent air bubbles and connecting, continuous air bubbles, it is possible to "automatically" control the height of flame. This automatic control of the flow of gaseous fuel is achieved by the compression of the gas flow passages as the temperature increases. This phenomenon eliminates the need for a separate, manually operated mechanism to lower the flame height as the temperature increases.

Figure 12:
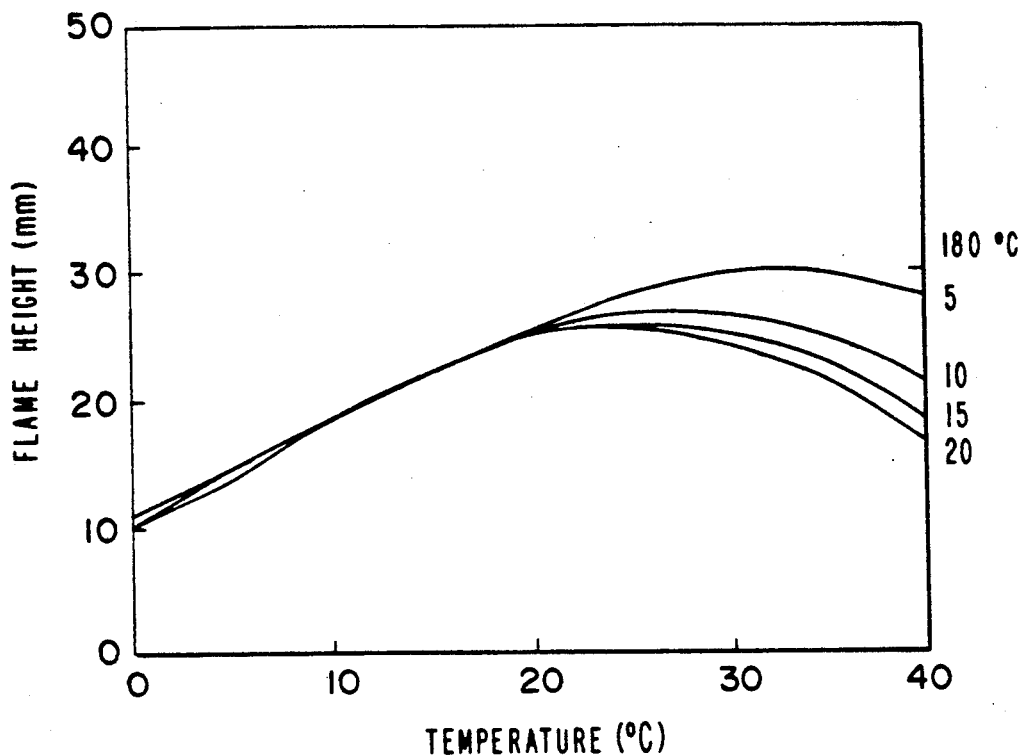
FIG. 12 is a graph plotting the effect of varying the time of the heat compression step on the flame height at varying temperatures.

The ratio of the number and size of the continuous air bubbles 52, 56 (through which the gas flows) and the independent air bubbles 54' can be varied during the thermal compression step (FIG. 6) by selecting the heating temperature and/or compression time. By varying the compression time and/or temperature, the number of connected, continuous air bubbles 52, 56 can be increased or decreased, as desired. As the number and/or size of connected or continuous air bubbles 52, 56 is decreased by increasing the number and/or size of the independent air bubbles 54', the flame height can be caused to decrease at predetermined temperature changes, as illustrated in the graph of FIG. 12, which illustrates curves plotting flame length and temperature characteristics, for microcell polymer filters heat pressed at 180 degrees centigrade for 5, 10, 15 and 20 minutes, respectively. Thus, the heat pressing step can produce filters for a variety of different applications.

Figure 13:
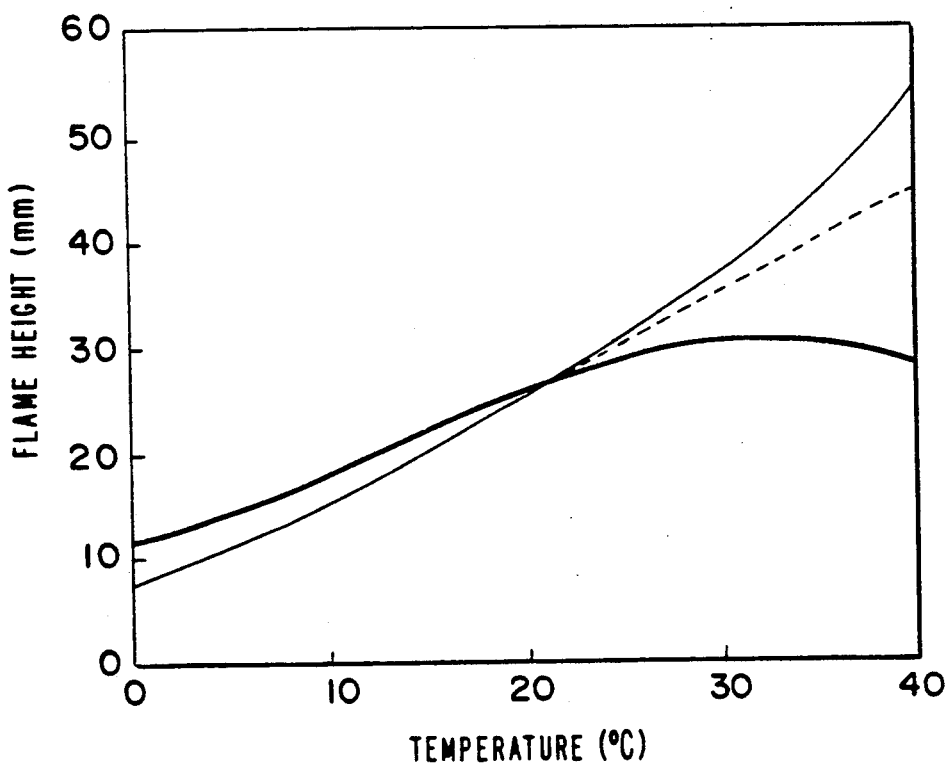
FIG. 13 is a graph plotting the flame height at varying temperatures for prior art flow regulating mechanisms and that of the present invention.

In the graph of FIG. 13, the flame height at varying temperatures has been plotted in a solid line for gas lighters of the type discussed in reference to FIG. 3, in dotted line for gas lighters using the microporous filter discussed in reference to FIGS. 4-5, and in very thick solid line for gas lighters provided with the microcell polymer filters of the present invention. In compiling this data the flame length was adjusted to 25 mm at 20 degrees centigrade. That is, the lighters used for obtaining the data of FIG. 13 were selected from a number of lighters, and only the lighters which could be adjusted to provide a flame height of 25 mm in length at 20 degrees centigrade selected. The relationship between the temperature and the flame length was then obtained by repeated testing. It will be apparent that in the case of the gas lighter of the present invention as the temperature increases the gas passageways are blocked sufficiently by the expansion of the independent air bubbles in the filter to effectively control the flame length.

Figure 14:
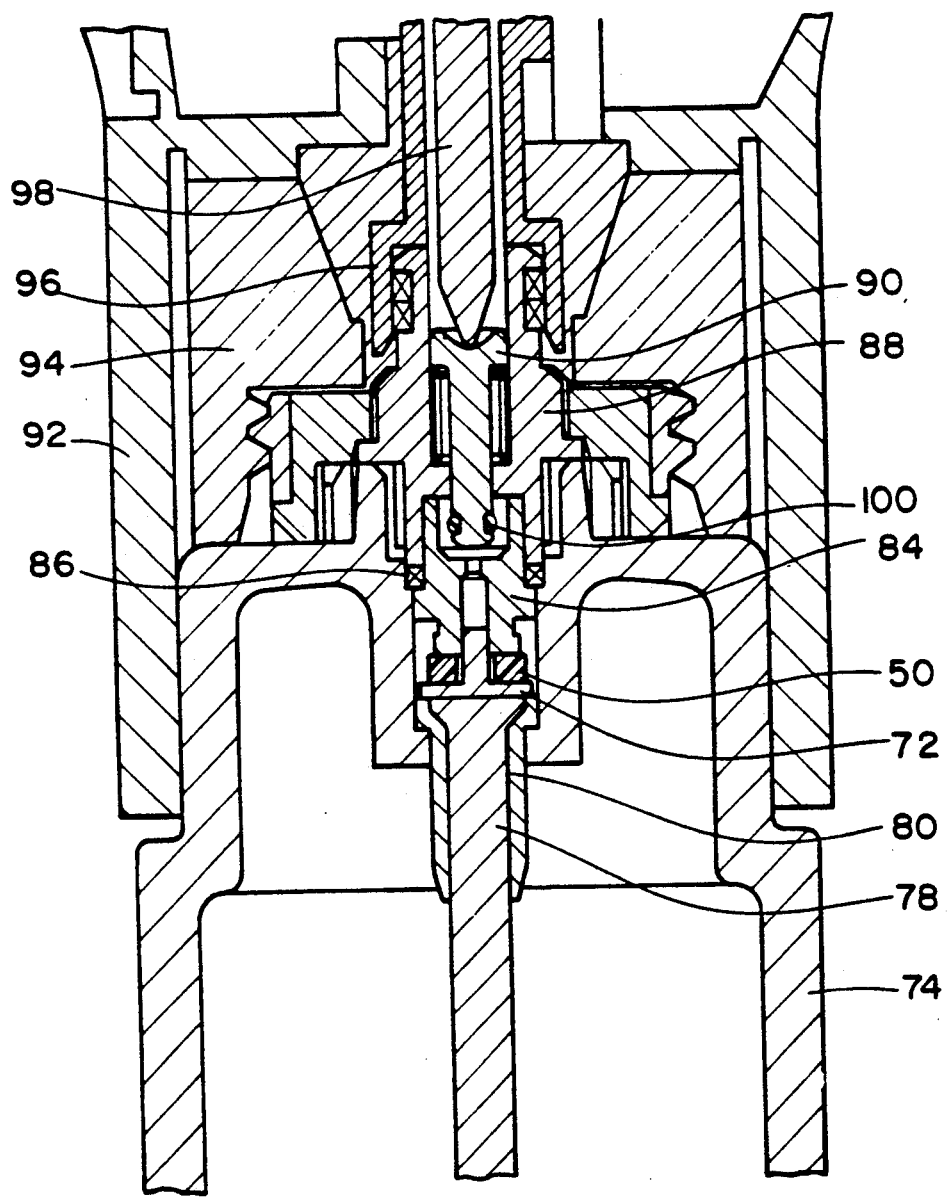
FIG. 14 is a cross-sectional view of a portion of a hair curler heated by gas including the flow regulating member of the present invention featuring the microcell polymer filter.

As previously indicated, the gas flow rate regulating mechanism, featuring the microcell polymer filter, may be used in devices other than gas cigarette lighters. FIG. 14 illustrates a hair curler device, wherein heat is supplied by ignited butane. The gas cylinder or tank 74 is provided with a nail-shaped retainer 72 on which the microcell polymer filter 50 is mounted. The wick 78 is mounted within the holder 80 and extends into the reservoir of the tank. A nozzle plug 84 extends upwardly from the filter 50 and is mounted within the cylinder 74 with an O-ring 86. A valve body 88 extends upwardly from the nozzle plug 84 and contains a nozzle 90 which is normally spring biased upwardly.

The cover 92 of the hair curler is slidably mounted over the tank 74 and the holder 94 abuts the top of the tank 74. The regulator 96 and nozzle push pin 98 extend downwardly from the hair curler. It will be apparent that as the user of the hair curler causes the nozzle push pin 98 to be depressed the O-ring 100 unseats, permitting the fuel to pass upwardly through the filter 50.

We claim:

1. A flow regulating mechanism for a gas emitting device having a fuel reservoir, a nozzle from which gas is discharged, and a passageway connecting the reservoir and nozzle, comprising a microcellular polymer filter within the passageway having connected, continuous bubbles through which fuel passes and independent air bubbles which expand with increases in temperature compressing and thereby restricting the flow of fuel through the connected, continuous bubbles.

2. A flow regulating mechanism as in claim 1, wherein the microcellular polymer filter is disc-shaped having upper and lower surfaces which are fused so as not to be substantially permeable.

3. A flow regulating mechanism as in claim 2, wherein said continuous bubbles are oriented between said upper and lower surfaces.

4. A flow regulating mechanism as in claim 1, wherein the microcellular polymer filter is ether urethane having foams of 10–300 μm in diameter.

5. A flow-regulating mechanism as in claim 4, whereas the microcellular polymer filter is of a density 0.1–0.6 g/cm$^3$.

6. A flow regulating mechanism as in claim 4, wherein the microcellular polymer filter is disc-shaped having upper and lower surfaces which are fused so as not to be substantially permeable.

7. A flow regulating mechanism as in claim 1, wherein the independent air bubbles are produced by thermal compression.

8. A flow regulating mechanism as in claim 1, wherein the groups of connected, continuous bubbles through which fuel passes are arranged generally perpendicular of the passageway connecting the reservoir and nozzle.

9. A burner valve, comprising a valve member provided with a valve seat, a moveable nozzle mounted for movement within the valve member and containing a passageway for transmitting fuel and a valve seat, means normally urging the sealing gasket into engagement with the valve seat, a microcellular polymer filter having a first group of continuous bubbles through which fuel may pass and a second group of independent air bubbles, the top and bottom portions of the filter being fused to be substantially impermeable, and a wick extending downwardly from the valve and in communication with the passageway through the filter.

10. A burner valve as in claim 9, wherein the microcellular polymer filter is ether-type foam urethane.

11. A burner valve as in claim 9, wherein the microcellular polymer filter is disc-shaped.

12. An appliance, comprising a gas emitting device, fuel reservoir, a nozzle from which gas is discharged, a passageway connecting the reservoir and the nozzle, and a microcellular polymer filter within the passageway having connected, continuous bubbles through which fuel passes and independent air bubbles which expand with increases in temperature compressing and thereby restricting the flow of fuel through the connected, continuous bubbles.

13. An appliance as in claim 12, wherein the microcellular polymer filter is disc-shaped having upper and lower surfaces which are fused so as not to be substantially permeable.

* * * * *